United States Patent
Hewitt et al.

(10) Patent No.: US 6,825,877 B1
(45) Date of Patent: Nov. 30, 2004

(54) MULTIPLEX BUCKET BRIGADE CIRCUIT

(75) Inventors: Mary J. Hewitt, Santa Barbara, CA (US); John L. Vampola, Santa Barbara, CA (US); Leonard P. Chen, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/479,699

(22) Filed: Jan. 7, 2000

(51) Int. Cl.[7] .......................... H04N 3/14; H04N 5/335
(52) U.S. Cl. ..................... 348/295; 377/57; 257/251
(58) Field of Search .......................... 377/61, 57, 58, 377/59, 60; 348/295, 294; 257/251

(56) References Cited

U.S. PATENT DOCUMENTS

| | | | |
|---|---|---|---|
| 4,107,550 A | * 8/1978 | Jacquart et al. | 377/61 |
| 4,709,380 A | * 11/1987 | Itoh | 377/58 |
| 4,956,686 A | * 9/1990 | Borrello et al. | 257/440 |
| 5,149,954 A | * 9/1992 | Pettijohn et al. | 250/208.1 |
| 5,315,114 A | * 5/1994 | Kansy et al. | 250/332 |
| 6,133,596 A | 10/2000 | Woolaway et al. | |
| 6,459,077 B1 | * 10/2002 | Hynecek | 250/208.1 |

\* cited by examiner

Primary Examiner—Wendy R. Garber
Assistant Examiner—Matthew L Rosendale
(74) Attorney, Agent, or Firm—William C. Schubert

(57) ABSTRACT

A sensor chip assembly time delay integration circuit useful with image sensing arrays uses a duplex bucket brigade circuit (120) with two or more charge transfer paths, a number of capacitors (130, 133, 136) common to the charge transfer paths, and a number of capacitors (131, 132, 134, 135) specific to each of the charge transfer paths. Each of the charge transfer paths has a number of MOSFET transfer gates (122, 124, 126, 128; 123, 125, 127, 129) connected in series, and the common capacitors and the path-specific capacitors are alternately connected to the paths. Each of the common capacitors is controllably connected (112, 115, 118) either to a unit cell input circuit (113, 116, 119), a reset node (111, 114, 117), or an open circuit. The circuit operates by storing accumulated image sensor charges from alternate sensor lines on the path-specific capacitors. The common capacitors are reset and then connected to the unit cell input circuits to acquire a first set of image sensor charges. Charges stored on, for example, the capacitors of a particular path are then transferred to the common capacitors through transfer gates, in effect accumulating charge on the common capacitors. Then, charges are transferred from the common capacitors to the capacitors of the same particular path to again store the charges. The sequence of reset, charge acquisition, summation transfer, and storage transfer is repeated for each of the charge transfer paths.

18 Claims, 11 Drawing Sheets

MULTIPLEX BUCKET BRIGADE CIRCUIT

This invention was made with U.S. Government support.

BACKGROUND OF THE INVENTION

This invention was made with Government support under contract awarded by the Government. The Government has certain rights in this invention.

1. Field of the Invention

The present invention relates to circuits useful in processing the output of image sensing arrays. More specifically, the present invention relates to Time Delay Integration ("TDI") circuits usefull in processing the output of image sensing arrays.

2. Description of the Related Art

While Time Delay Integration ("TDI") architecture is typically found in high speed digital image sensing devices such as Charge Coupled Device ("CCD") image sensors to achieve satisfactory sensitivity, it has utility with many various types of image sensing arrays variously sensitive to, for example, the infrared, visible light, and X-ray wavelengths. In the TDI architecture, the image sensing array is optically scanned so that each part of the image is sensed with different parts, typically lines, of the array in a synchronized, delayed manner. The plural outputs over time of the image sensing array for each part of the image are summed, thereby improving the sensitivity and spatial resolution of the image sensing device. One measure of performance of image sensing devices is the Modulation Transfer Function ("MTF"), which is defined as the ratio of the modulation of the output signal to the modulation of the input signal, versus spatial frequency.

Typically, the TDI circuits are implemented in a type of silicon-based integrated circuit known as a Read-Out Integrated Circuit ("ROIC"), which is combined with the sensing array to form a Sensor Chip Assembly ("SCA"). SCAs are used in a variety of digital imaging systems, including, for example, night vision cameras, surveillance cameras, remote imaging cameras, and manufacturing line inspection cameras, and are suitable even for standard army dewar assembly ("SADA") type applications and three color activities. Three color activities are scanning systems which incorporate more than one spectral band, or color, on a SCA. Each of the colors is defined by a bank of sensing elements on which a single spectral color is incident. SCAs are particularly useful when the sensing array is made of a non-silicon semiconductor material, which is typical since non-silicon semiconductor materials are inherently sensitive to various useful portions of the electromagnetic spectrum. Image information in the form of electrical charge is produced in the imaging array. The charge is collected and processed by the typically silicon-based ROIC. SCAs are manufactured using a variety of well known techniques, ranging from fabricating the sensing array separately from the ROIC and mounting the sensing array and ROIC on a common substrate or a common printed circuit board, to mounting the sensing array substrate on the ROIC substrate and then fabricating the sensing array.

Time delay integration may be performed in a SCA TDI architecture using a CCD array in a "side rider" configuration. Unfortunately, the design rules used for the integrated circuit do not allow for placing large storage wells and the other elements of the circuit in the unit cell for small unit cell areas, thereby limiting the maximum resolution of the CCD sensing device. While time delay integration can also be implemented using standard bucket brigade ("BBD") circuits instead of CCDs, a need exists in the art for a TDI circuit that is useful in processing the output of image sensing arrays and has reduced ROIC circuitry relative to the ROIC circuitry required in the side rider CCD implementation while maintaining or improving MTF.

SUMMARY OF THE INVENTION

The need in the art is addressed by the present invention, which in one embodiment is a time delay integration circuit for acquiring a number n of samples per dwell. The time delay integration circuit comprises a plurality of first capacitors; a plurality of imaging sensor unit cell inputs controllably coupled respectively to the first capacitors; a plurality of groups of n second capacitors; and a plurality n of charge transfer paths comprising transfer gates coupled in series through path segments, the path segments of the charge transfer paths being coupled in succession to, alternately, one of the first capacitors and to respective second capacitors in one of the groups of second capacitors.

Another embodiment of the invention is a time delay integration circuit comprising a plurality of first capacitors; a plurality of imaging sensor unit cell inputs controllably coupled respectively to the first capacitors; a plurality of reset inputs controllably coupled respectively to the first capacitors; a plurality of second capacitors; a plurality of third capacitors; a first charge transfer path comprising a plurality of first transfer gates coupled in series through a plurality of first path segments, the first path segments being coupled alternately to respective ones of the first and second capacitors; and a second charge transfer path comprising a plurality of second transfer gates coupled in series through a plurality of second path segments, the second path segments being coupled alternately to respective ones of the first and third capacitors.

Another embodiment of the invention is a sensor chip assembly time delay integration circuit comprising a plurality of successively coupled circuit groups. Each of the circuit groups comprises a first phase clock node; a second phase clock node; a reset node; a unit cell input circuit; a first capacitor having a first plate coupled to the second phase clock node and a second plate; a switch having first and second terminals and a pole terminal, the first terminal being coupled to the reset node, the second terminal being coupled to the unit cell input circuit, and the pole terminal being coupled to the second plate of the first capacitor; a first transfer gate having a first terminal coupled to the second plate of the first capacitor and a second terminal; a second transfer gate having a first terminal coupled to the second plate of the first capacitor and a second terminal; a third transfer gate having a first terminal coupled to the second plate of the first capacitor and a second terminal; a fourth transfer gate having a first terminal coupled to the second plate of the first capacitor and a second terminal; a second capacitor having a first plate coupled to the first phase clock node and a second plate coupled to the second terminal of the fourth transfer gate; and a third capacitor having a first plate coupled to the first phase clock node and a second plate coupled to the second terminal of the third transfer gate. The second terminal of the first transfer gate and the second terminal of the third transfer gate of respective adjacent ones of the circuit groups are coupled together, and the second terminal of the second transfer gate and the second terminal of the fourth transfer gate of respective adjacent ones of the circuit groups are coupled together.

Another embodiment of the present invention is a method of time delay integration of image sensor charges, comprising storing accumulated image sensor charges from alternate sensor lines on respectively a plurality of first capacitors and a plurality of second capacitors; resetting a plurality of third capacitors; receiving a first set of image sensor charges on the third capacitors; transferring charge from the first capacitors respectively to the third capacitors through a set of first transfer gates, wherein charge is accumulated on the third capacitors; transferring charge from the third capacitors respectively to the first capacitors through a set of second transfer gates; resetting the third capacitors; receiving a second set of image sensor charges on the third capacitors; transferring charge from the second capacitors respectively to the third capacitors through a set of third transfer gates, wherein charge is accumulated on the third capacitors; and transferring charge from the third capacitors respectively to the second capacitors through a set of fourth transfer gates.

BRIEFS DESCRIPTION OF THE DRAWINGS

DESCRIPTION OF THE INVENTION

Illustrative embodiments and exemplary applications will now be described with reference to the accompanying drawings to disclose the advantageous teachings of the present invention.

Figure 1:
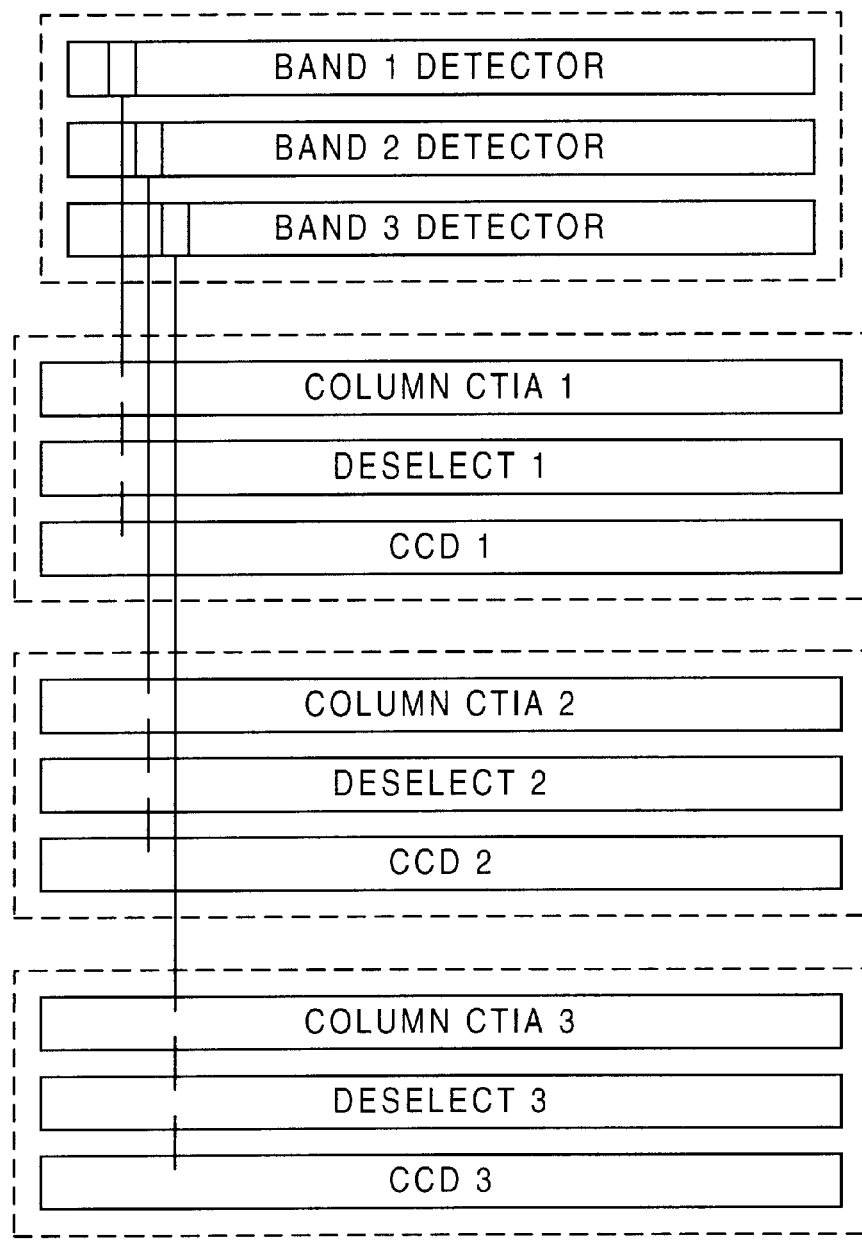
FIG. 1 is a block schematic diagram of a CCD-based side rider SCA architecture.

FIG. 1 shows a SCA TDI architecture in which time delay integration is performed using a CCD array in a "side rider" configuration; see, e.g., "High Performance InSb Scanning Sensor Chip with 26 In TDI," Proceedings of the IRIS, August, 1992. The side rider CCD implementation operates by injecting charge into every other bucket of the CCD circuit from the multiplexed unit cell outputs. Due to the size of the storage wells required in the CCD circuit of FIG. 1 to reduce noise, the storage wells are typically large in area. Unfortunately, the design rules used for the integrated circuit do not allow for placing such large storage wells and the other elements of the BBD circuit 10 in the unit cell for unit cell areas of less than about 32 um×64 um, thereby limiting the maximum resolution of the CCD sensing device.

Figure 2:
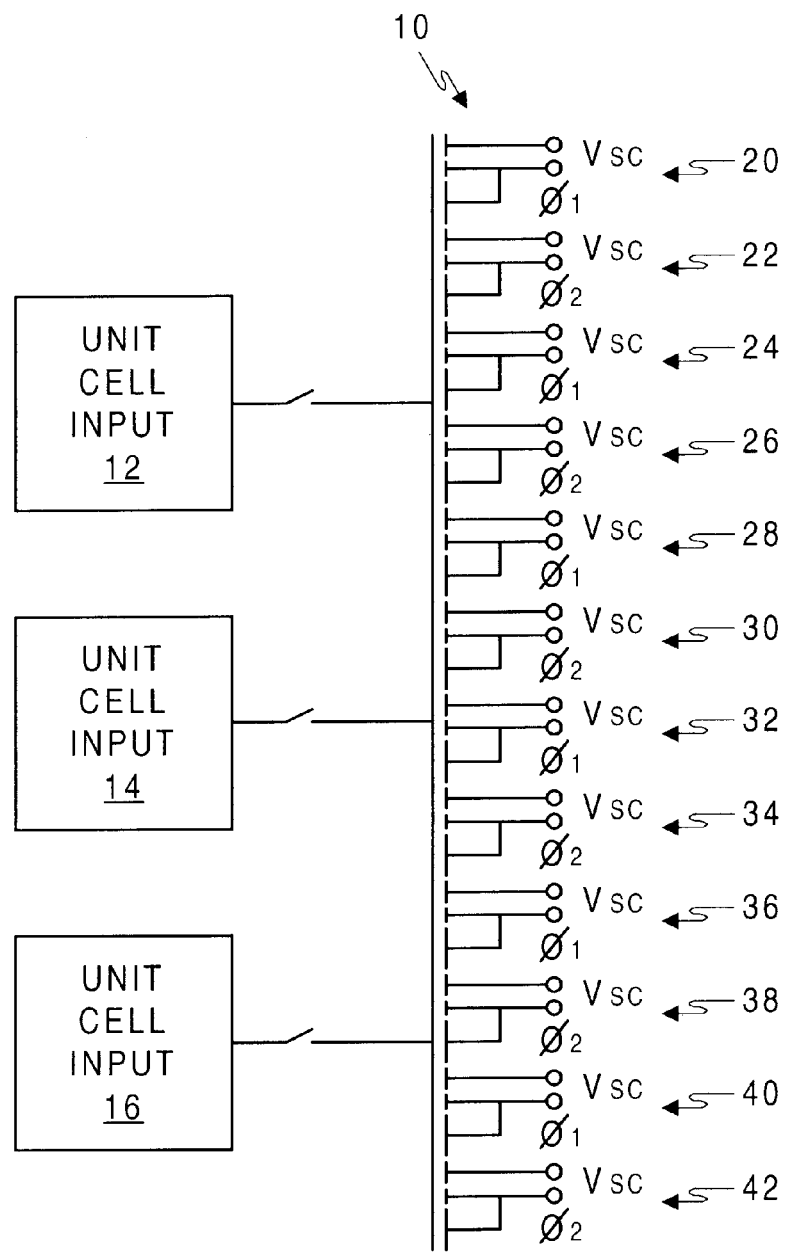
FIG. 2 is a circuit diagram of a bucket brigade circuit.

FIG. 2 is an example of one type of bucket brigade ("BBD") circuit that is useful for implementing time delay integration.

Figure 3:
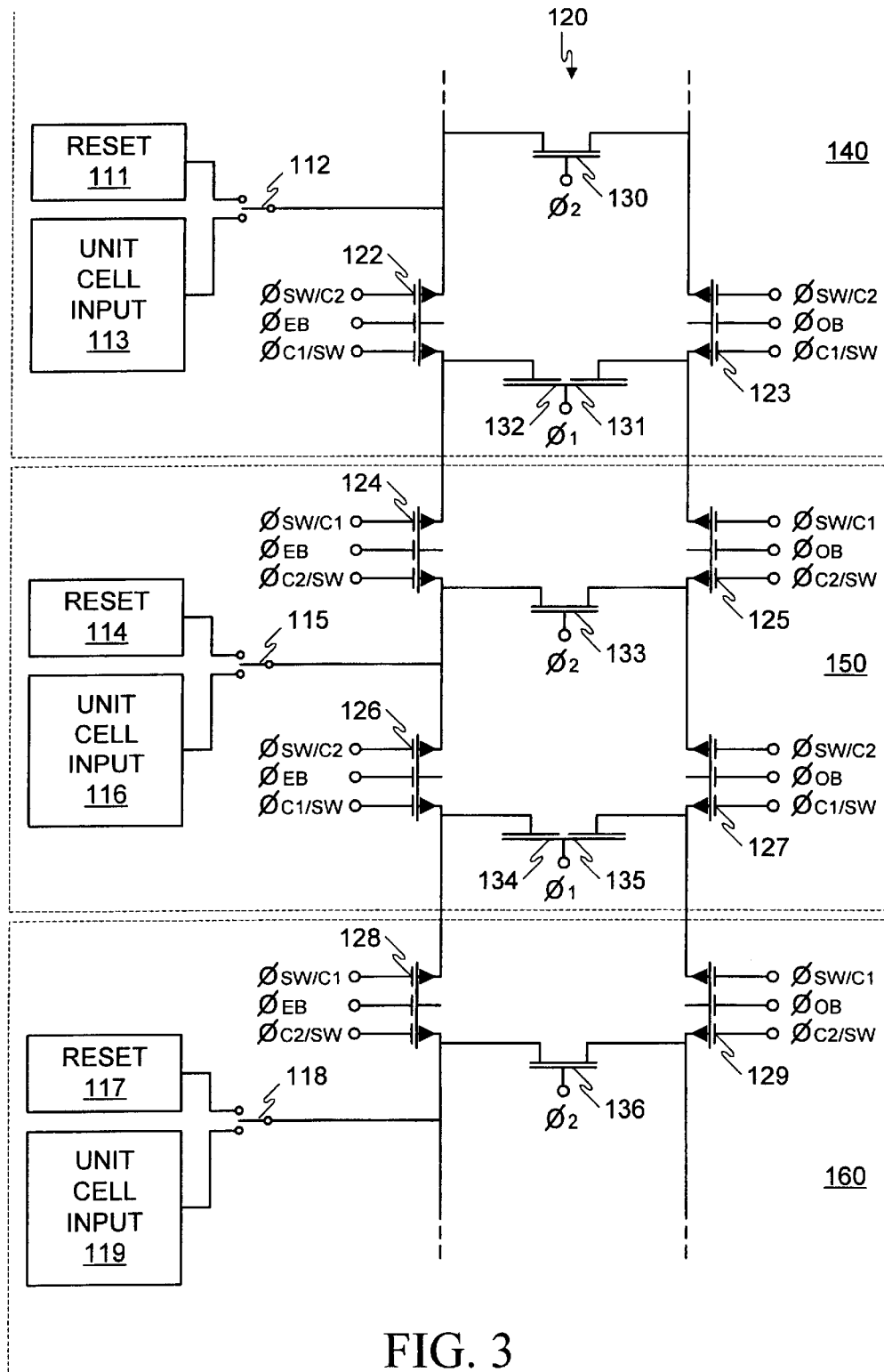
FIG. 3 is a circuit diagram of a duplex bucket brigade circuit for a two sample per dwell SCA TDI, in accordance with the present invention.

FIG. 3 shows a representative segment of a duplex BBD circuit 120 which performs a SCA TDI with reduced ROIC circuitry, thus allowing the TDI function to be placed in the unit cells. With only conventional layout techniques and fabrication processes, reductions in ROIC area of up to about 70% over the side rider CCD implementation is achievable, which allows the duplex BBD circuit 120 to be place in an area of about 10 um×64 um so that TDI may be performed in the unit cell with room still available for the input circuit. Hence, improved ROIC yields, reduced ROIC costs, and improved resolution relative to the side rider CCD implementation are realizable. Moreover, specialized processing used for the two level polysilicon structures used in the side rider CCD implementation is not required.

Size reduction is realizable in the duplex BBD circuit 120 for a number of reasons. For example, the duplex BBD circuit 120 reduces the number of transfers required to perform TDI by at least a factor of two, which allows the capacitor size to be reduced by a factor of the square root of two—the square root of the reduction in number of transfers—for the same noise performance when compared to a standard BBD implementation. The charge transfer efficiency required is reduced by a factor of 2 when compared to CCD or standard BBD implementations. Another example is the use of parallel signal paths implemented at the unit cell level, which allow sharing of a storage capacitor—only three storage capacitors are required to store two samples of information—to in effect achieve a reduction in the number of capacitors of about 25% for a two sample/dwell system and a reduction in total capacitor area. Accordingly, performance is improved with less ROIC complexity. Moreover, the common capacitors are easily reset prior to charge being added to improve the composite transfer efficiency and reduce crosstalk in the in scan direction, which is useful for achieving a good MTF in scanning SCAs. In general terms, a multiplex BBD structure used in a TDI circuit decreases the number of transfers of a TDI sample to the number of sensing elements independently of the number of samples per dwell, and increases the MFT through resetting of some of the BBD capacitors. The decrease in the number of transfers results in a reduction of the number of capacitors and the size of the capacitors, as well as an improved MTF.

Bi-diretionality is realized using, for example, the technique described in commonly assigned U.S. patent application Ser. No. 09/479,703 (Application of Chen et al. Entitled "Bi/directional Bucket Brigade Circuit," filed on Jan. 7, 2000, which hereby is incorporated herein by reference in its entirety.

FIG. 3 shows three representative unit cells, illustratively partial cell 140, full cell 150, and partial cell 160, having respective unit cell inputs 113, 116 and 119. The even path of the duplex BBD circuit 120 has transfer gates such as MOSFET transistors 122, 124, 126 and 128 connected in series, and the odd path of the duplex BBD circuit 120 has transfer gates such as MOSFET transistors 123, 125, 127 and 129 connected in series. Suitable MOSFET transistors are well known in the art. Common capacitor 130, 133, and 136, which are controlled by clock phase $\emptyset_2$, and even odd capacitor pairs 132–131 and 134–135, which are controlled by clock phase $\emptyset_1$, are alternately connected between the even and odd paths of the duplex BBD circuit 120. Suitable semiconductor capacitors are well known in the art. Transistor switch 112 controllably connects the common capacitor 130 to either unit cell input 113, reset 111, or open circuit. Similarly, transistor switch 115 controllably connects the common capacitor 133 to either unit cell input 116, reset 114, or open circuit; and transistor switch 118 controllably connects the common capacitor 136 to either unit cell input 119, reset 117, or open circuit. Suitable MOSFET transistor switches are well known in the art.

It will be appreciated that while the circuit 120 is shown as a duplex circuit having two charge transfer paths, illustratively designated. odd and even, circuit 120 is to be considered to be representative of multiplex BBD circuits having two, three, or more charge transfer paths to achieve two, three, or more samples per dwell. A "dwell" is in effect the time over which charge is integrated. Although requiring more circuitry, systems that acquire a higher multiple of samples per dwell advantageously have improved sensitivity even while realizing size reduction.

Figure 11:
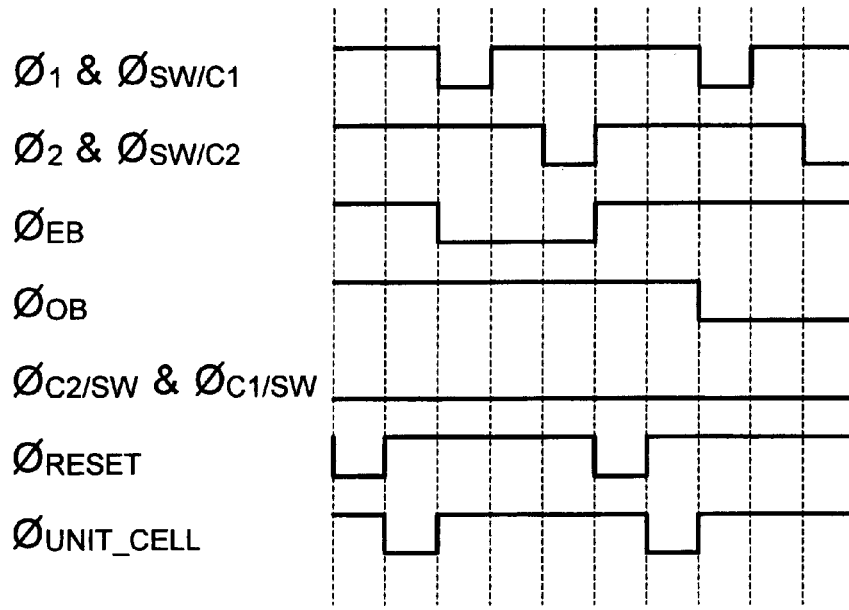
FIG. 11 is a waveform diagram of various clock and control signals used in the transfer up process.
Figure 12:
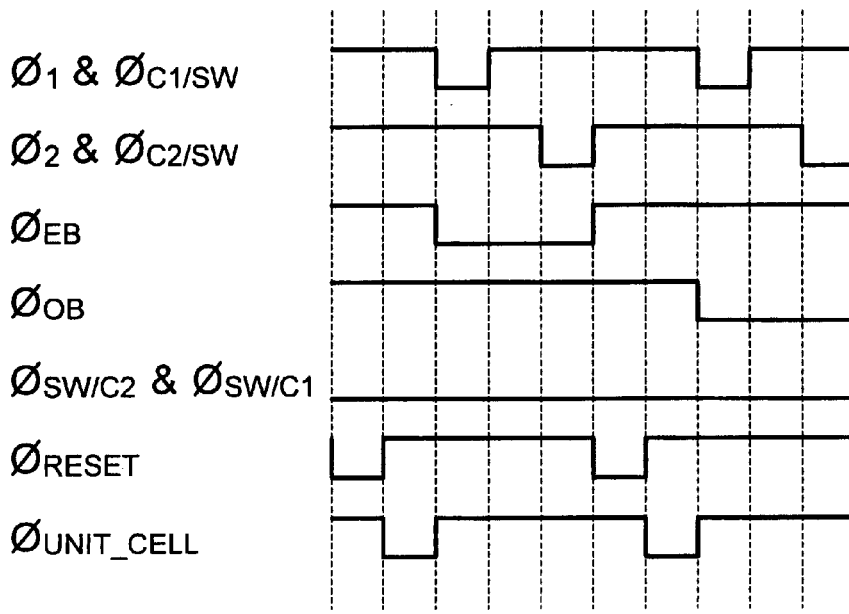
FIG. 12 is a waveform diagram of various clock and control signals used in the transfer down process.

Operation of the duplex BBD circuit 120 is illustrated in FIGS. 4 through 10. In these figures, potential at a node is represented by a box containing a letter indicating the ground position that the detector started at, and numerical subscripts indicating the TDI number. The various clock and control signals used in the transfer-up and transfer-down process are shown in FIGS. 11 and 12 respectively.

Figure 4:
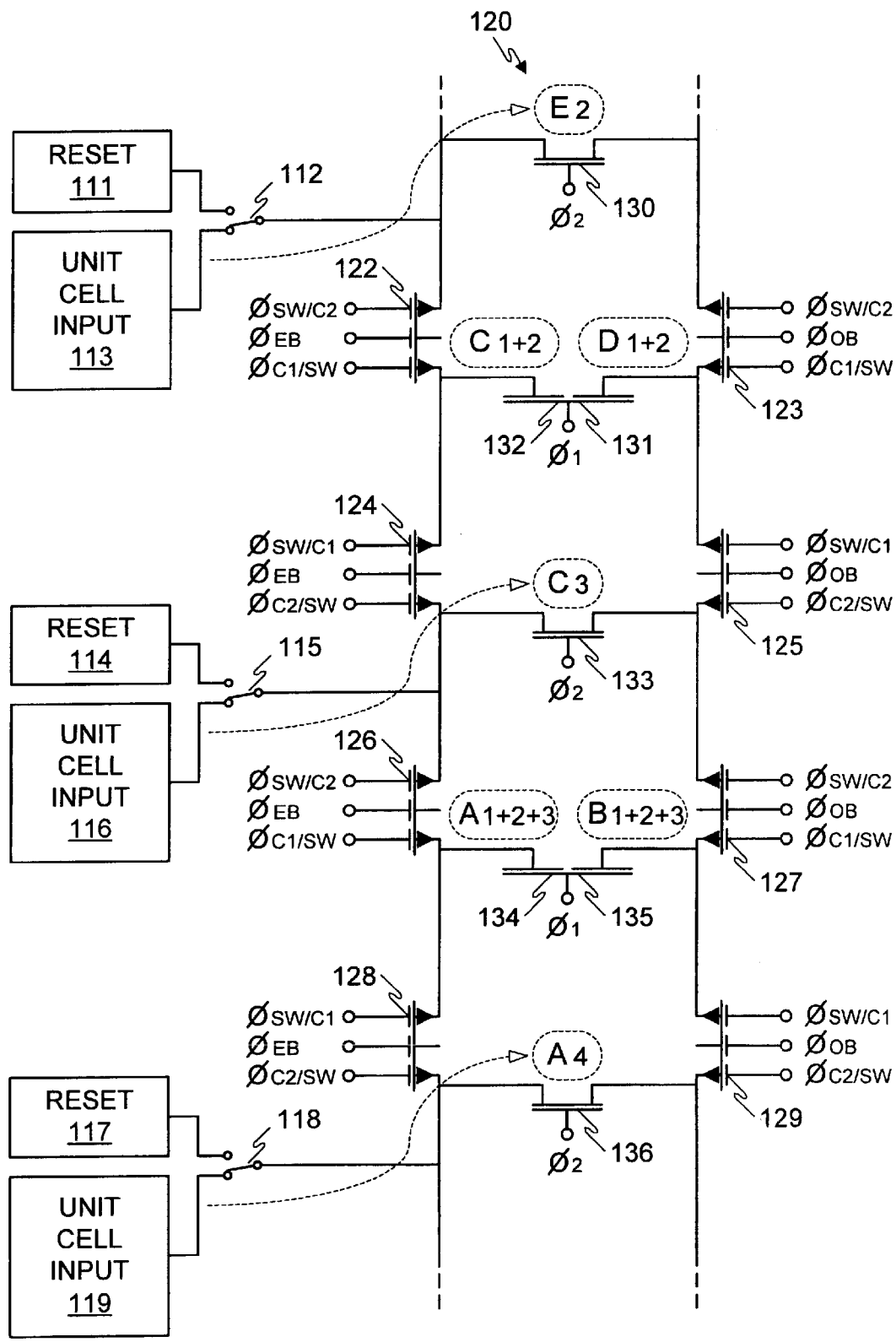
FIG. 4 is a circuit diagram of the duplex bucket brigade circuit of FIG. 3 showing how unit cell charge is transferred into the circuit.

FIG. 4 is a circuit diagram of the duplex bucket brigade circuit of FIG. 3 showing how unit cell charge is transferred into the duplex BBD circuit 120 for propagation down the even path. The common capacitors 130, 133 and 136 are presumed to start in a reset condition. Capacitors 131, 132, 134 and 135 respectively contain charge $D_{1+2}$, $C_{1+2+}$, $A_{1+2+3}$, and $B_{1+2+3}$. Switches 112, 115 and 118 select unit cell inputs 113, 116 and 119 in synchronism with clock phase $\emptyset_2$, thereby transferring charge $E_2$ to the common capacitor 130, charge $C_2$ to the common capacitor 133, and charge $A_4$ to the common capacitor 136.

Figure 5:
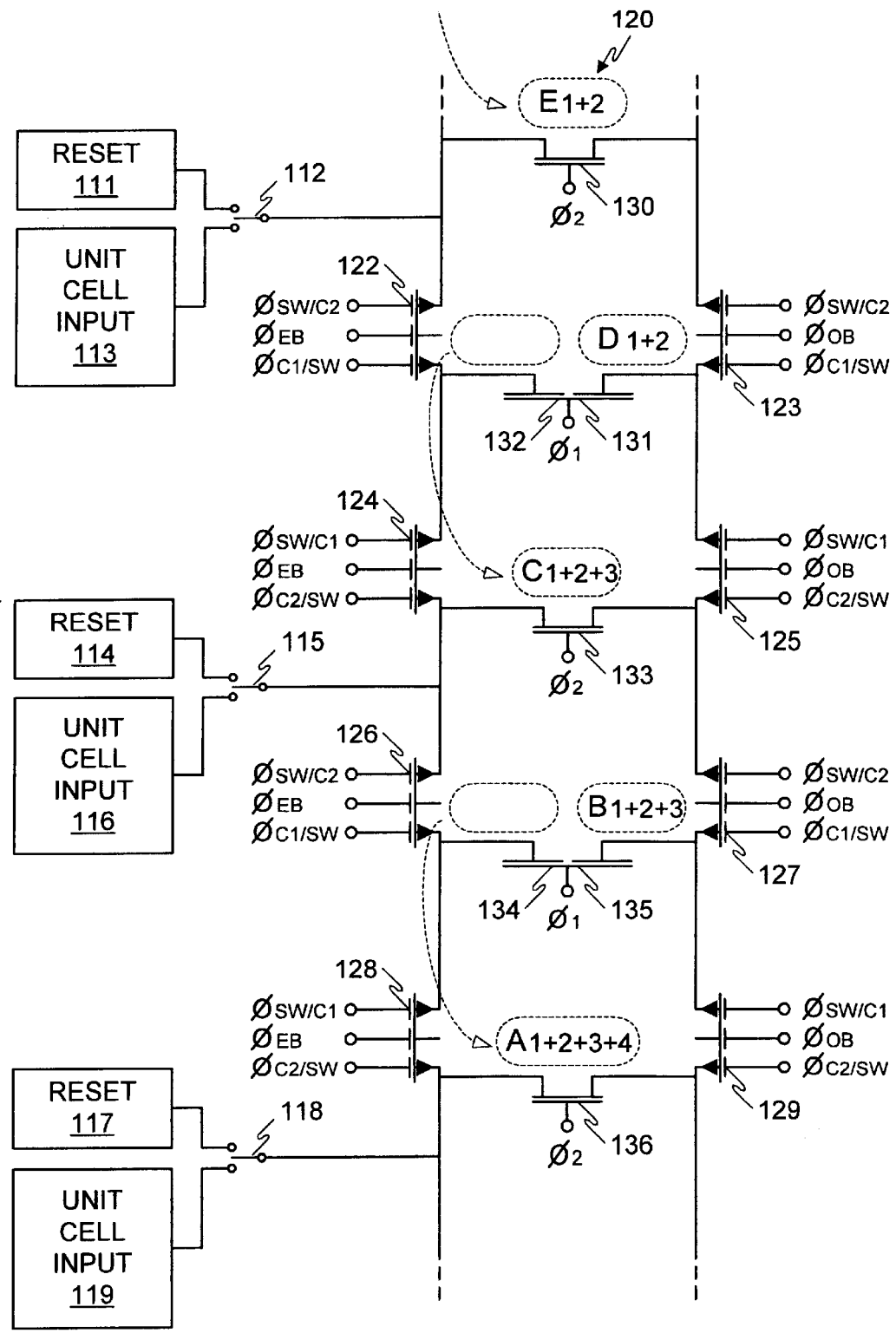
FIG. 5 is a circuit diagram of the duplex bucket brigade circuit of FIG. 3 showing how unit cell charge is added to previous even samples.

FIG. 5 is a circuit diagram of the duplex bucket brigade circuit of FIG. 3 showing how unit cell charge is added to previous even samples. Transistors 124 and 128 in the even path are enabled synchronously with clock phases $\emptyset_1$ and $\emptyset_2$, thereby moving charge $C_{1+2}$ through even path transistor 124 and adding it to charge $C_3$ on the common capacitor 133, and moving $A_{1+2+3}$ through even path transistor 128 and adding it to charge $A_4$ on the common capacitor 136. Charges $D_{1+2}$ and $B_{1+2+3}$ on the odd path capacitors 131 and 135 are undisturbed.

Figure 6:
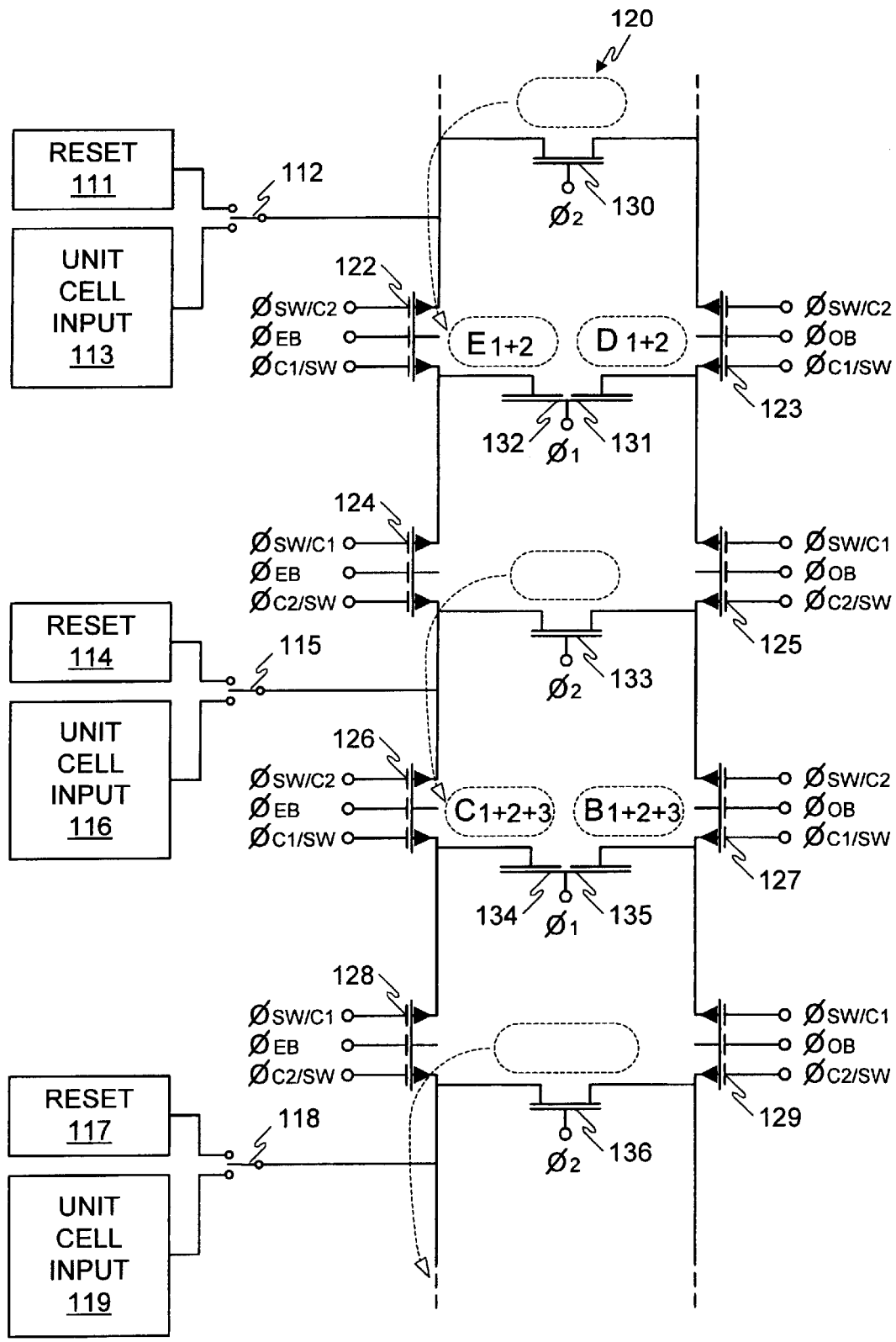
FIG. 6 is a circuit diagram of the duplex bucket brigade circuit of FIG. 3 showing how common capacitor charge is moved to the even path capacitors.

FIG. 6 is a circuit diagram of the duplex bucket brigade circuit of FIG. 3 showing how common capacitor charge is moved from the common capacitors to the even path capacitors so that the common capacitors are freed up for subsequent odd path operations. Transistors 122 and 126 in the even path are enabled synchronously with clock phases $\emptyset_1$ and $\emptyset_2$, thereby moving charge $E_{1+2}$ through the even path transistor 122 and placing it on the even path capacitor 132, and moving charge $C_{1+2+3}$ through even path transistor 126 and placing it on the even path capacitor 134. Charges $D_{1+2}$ and $B_{1+2+3}$ on the odd path capacitors 131 and 135 are undisturbed.

Figure 7:
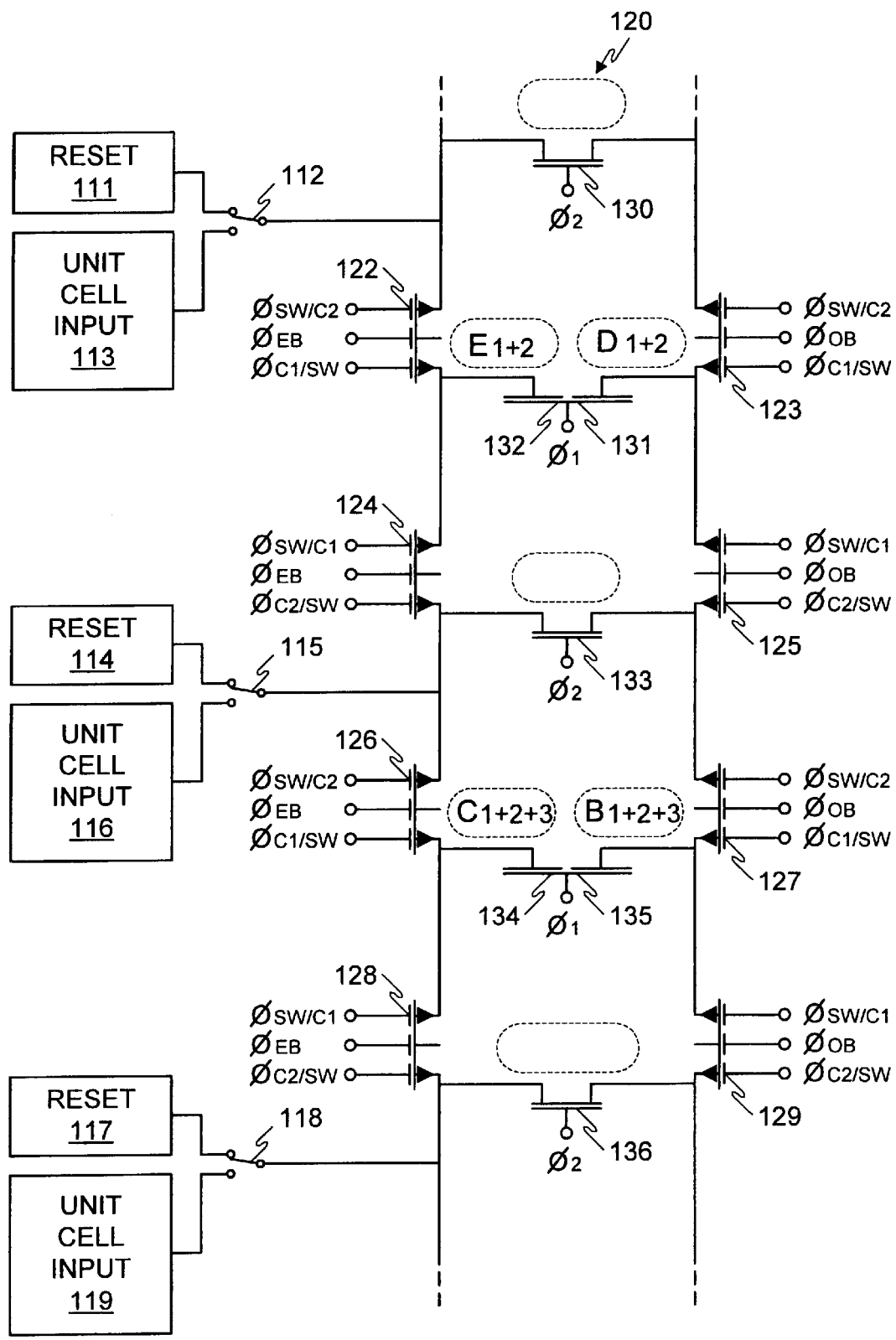
FIG. 7 is a circuit diagram of the duplex bucket brigade circuit of FIG. 3 showing how the common capacitors are reset.

FIG. 7 is a circuit diagram of the duplex bucket brigade circuit of FIG. 3 showing how the common capacitors are reset. Switches 112, 115 and 118 select resets 111, 114 and 117 synchronously with clock phase $\emptyset_2$, thereby resetting the common capacitors 130, 133 and 136. Transistors 122, 123, 124, 125, 126, 127, 128 and 129 are all OFF, so that charges $D_{1+2}$ on the odd path capacitor 131, charge $E_{1+2}$ on the even path capacitor 132, $C_{1+2+3}$ on the even path capacitor 134, and charge $B_{1+2+3}$ on the odd path capacitor 135 are undisturbed.

Figure 8:
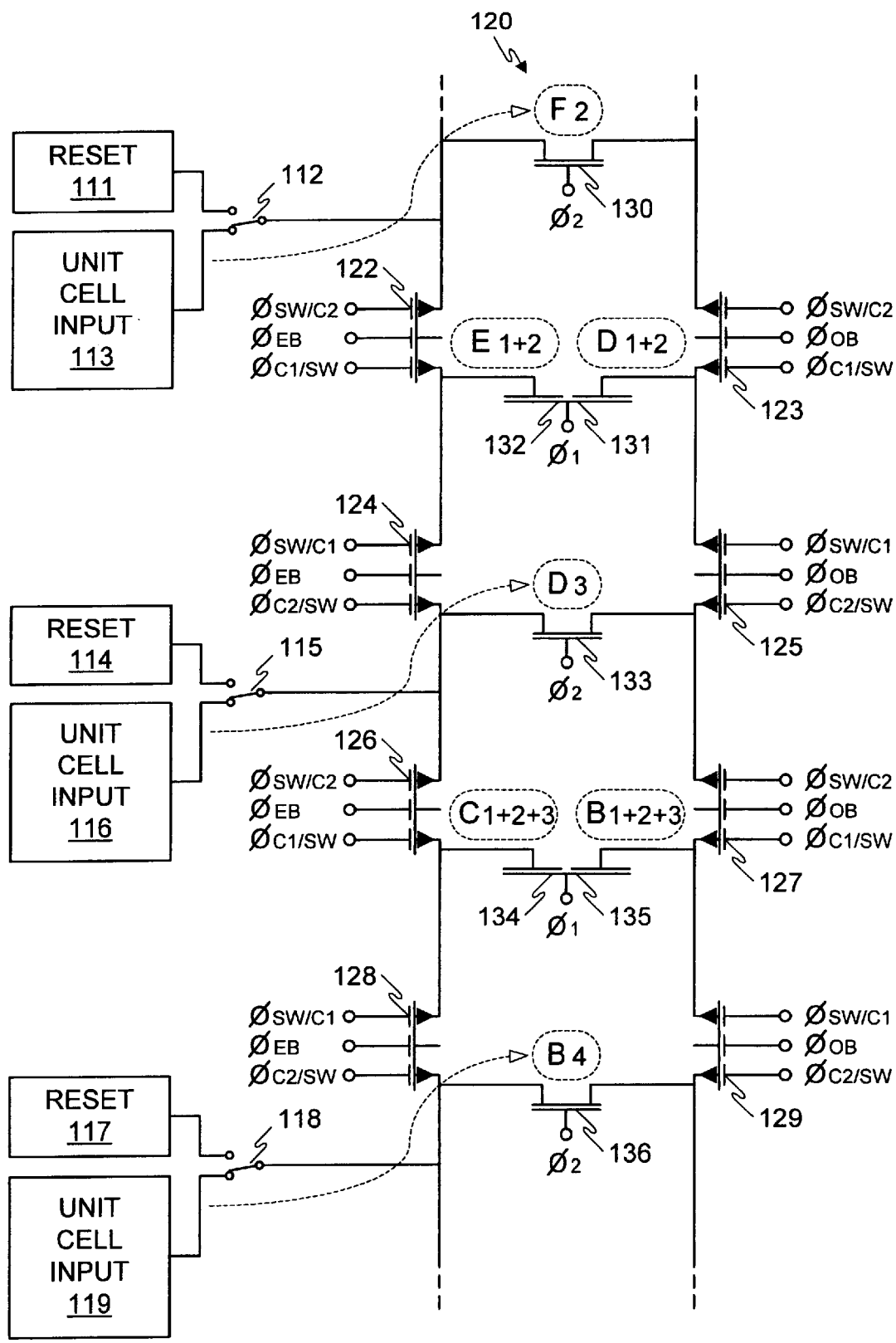
FIG. 8 is a circuit diagram of the duplex bucket brigade circuit of FIG. 3 showing how unit cell charge is transferred into the circuit.

FIG. 8 is a circuit diagram of the duplex bucket brigade circuit of FIG. 3 showing how unit cell charge is transferred into the circuit for propagation down the odd path. The common capacitors 130, 133 and 136 are in a reset condition. Capacitors 131, 132, 134 and 135 respectively contain charge $D_{1+2}$, $E_{1+2}$, $C_{1+2+3}$, and $B_{1+2+3}$. Switches 112, 115 and 118 select unit cell inputs 113, 116 and 119 in synchronism with clock phase $\emptyset_2$, thereby transferring charge $F_2$ to common capacitor 130, charge $D_3$ to common capacitor 133, and charge $B_4$ to common capacitor 136.

Figure 9:
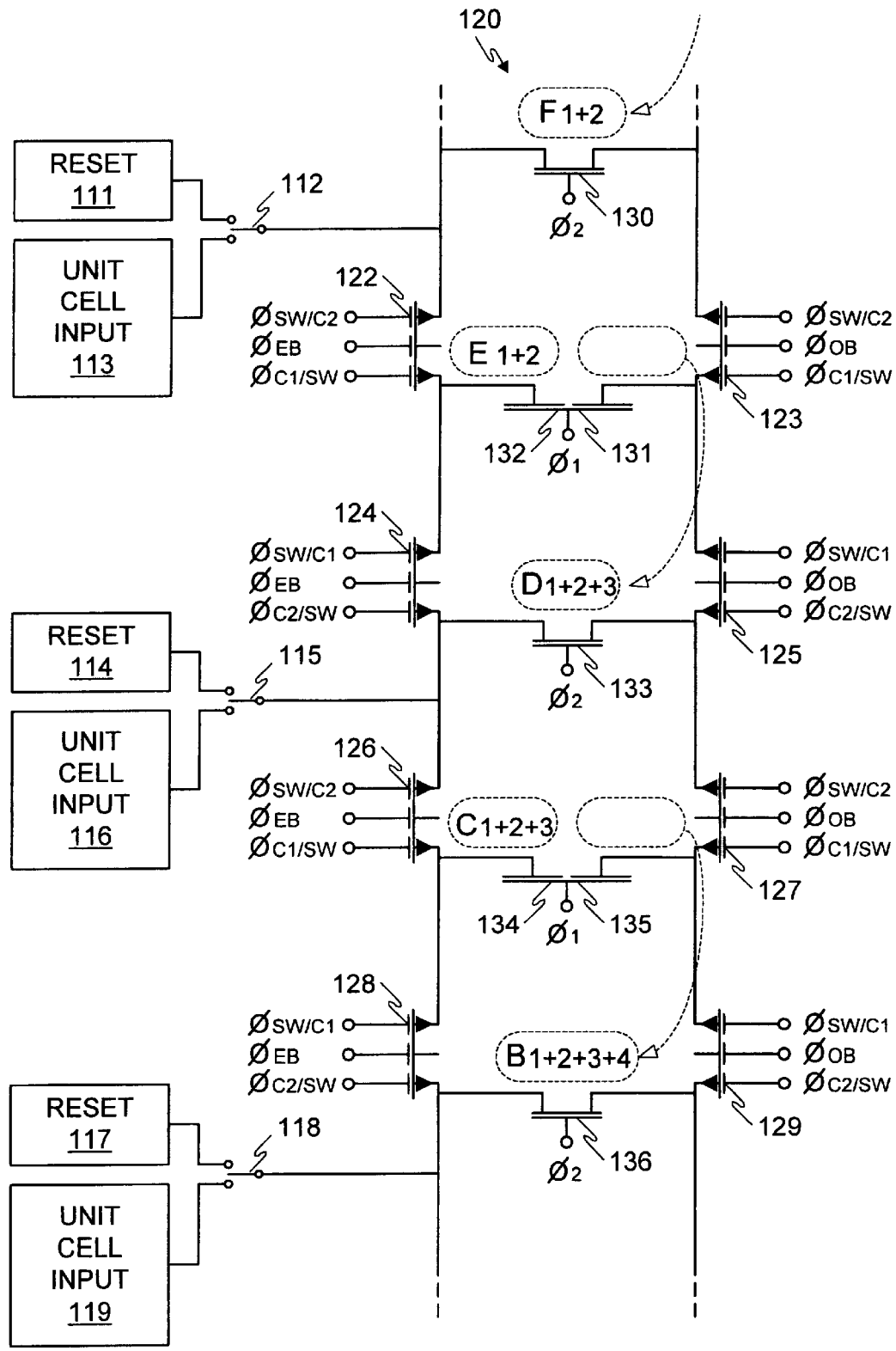
FIG. 9 is a circuit diagram of the duplex bucket brigade circuit of FIG. 3 showing how unit cell charge is added to previous odd samples.

FIG. 9 is a circuit diagram of the duplex bucket brigade circuit of FIG. 3 showing how unit cell charge is added to previous odd samples. Transistors 125 and 129 in the odd path are enabled synchronously with clock phases $\emptyset_1$ and $\emptyset_2$, thereby moving charge $D_{1+2}$ through the odd path transistor 125 and adding it to charge $D_3$ on the common capacitor 133, and moving charge $B_{1+2+3}$ through the odd path transistor 129 and adding it to charge $B_4$ on the common capacitor 136. Charges $E_{1+2}$ and $C_{1+2+3}$ on the even path capacitors 132 and 134 are undisturbed.

Figure 10:
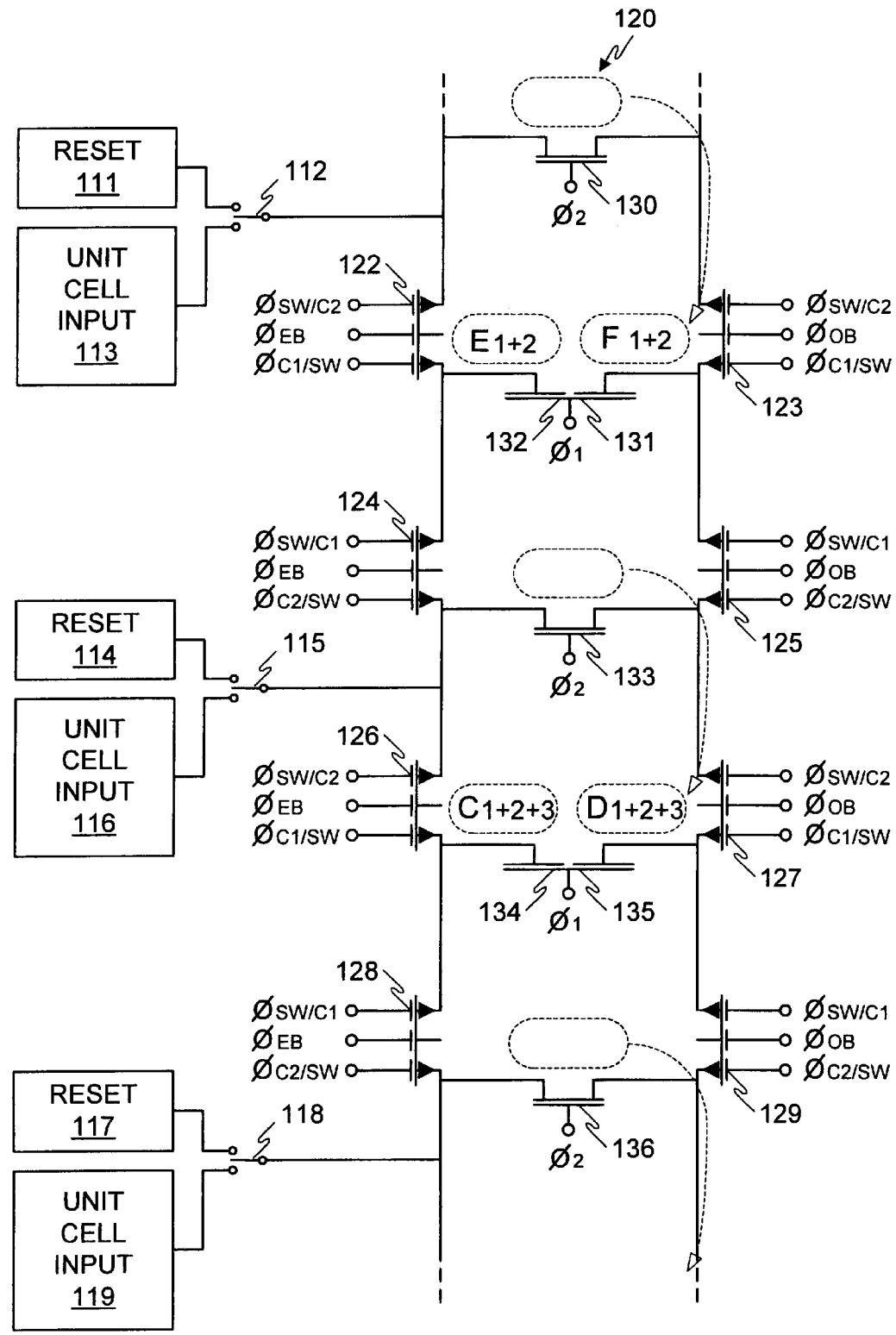
FIG. 10 is a circuit diagram of the duplex bucket brigade circuit of FIG. 3 showing how common capacitor charge is moved to the odd path capacitors.

FIG. 10 is a circuit diagram of the duplex bucket brigade circuit of FIG. 3 showing how common capacitor charge is moved from the common capacitors to the odd pad capacitors to that the common capacitors are freed up for subsequent even path operations. Transistors 123 and 127 in the odd path are enabled synchronously with clock phases $\emptyset_1$ and $\emptyset_2$, thereby moving charge $F_{1+2}$ through the odd path transistor 123 and placing it on the odd path capacitor 131, and moving charge $D_{1+2+3}$ through the odd path transistor 127 and placing it on the odd path capacitor 135. Charges $E_{1+2}$ and $C_{1+2+3}$ on the even path capacitors 132 and 134 are undisturbed.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A time delay integration circuit for acquiring a number n of samples per dwell, comprising:

a plurality of first capacitors;

a plurality of imaging sensor unit cell inputs controllably coupled respectively to the first capacitors;

a plurality of groups of n second capacitors;

a plurality n of charge transfer paths comprising a plurality of transfer gates coupled in series through a plurality of path segments, the path segments of the charge transfer paths being coupled in succession to, alternately, one of the first capacitors and to respective second capacitors in one of the groups of second capacitors;

a first phase clock node and a second phase clock node, wherein each of the first capacitors is coupled to the second phase clock node and each of the second capacitors is coupled the first phase clock node; and a plurality n of path control signal nodes, a first transfer control signal node, and a second transfer control signal node, wherein the transfer gates of each of the charge transfer paths are coupled to a respective one of the path control signal nodes, and adjacent transfer gates in the charge transfer paths are respectively coupled to the first transfer control signal node and to the second transfer control signal node.

2. A time delay integration circuit as in claim 1 further comprising a plurality of reset inputs controllably coupled respectively to the first capacitors.

3. A time delay integration circuit comprising:

a plurality of first capacitors;

a plurality of imaging sensor unit cell inputs controllably coupled respectively to the first capacitors;

a plurality of reset inputs controllably coupled respectively to the first capacitors;

a plurality of second capacitors;

a plurality of third capacitors;

a first charge transfer path comprising a plurality of first transfer gates coupled in series through a plurality of first path segments, the first path segments being coupled alternately to respective ones of the first and second capacitors; and a second charge transfer path comprising a plurality of second transfer gates coupled in series through a plurality of second path segments, the second path segments being coupled alternately to respective ones of the first and third capacitors.

4. A time delay integration circuit as in claim 3 further comprising a first phase clock node and a second phase clock node, wherein each of the fist capacitor is coupled to the second phase clock node and each of the second and third capacitors is coupled to the first phase clock node.

5. A time delay integration circuit as in claim 3 further comprising a first phase clock node and a second phase clock node, wherein:

each of the first capacitors comprises a first plate, a second plate, and a dielectric between the first and second plates, the first plate thereof being coupled to the first and second charge transfer paths and the second plate being coupled to the second phase clock node;

each of the second capacitors comprises a first plate, a second plate, and a dielectric between the first and second plates, the first plate thereof being coupled to the first charge transfer path and the second plate thereof being coupled to the first phase clock node; and each of the third capacitors comprises a first plate, a second plate, and a dielectric between the first and second plates, the first plate thereof being coupled to the second charge transfer path and the second plate thereof being coupled to the first phase clock node.

6. A time delay integration circuit as in claim 3 wherein the first and second transfer gates comprise MOSFET transistors.

7. A time delay integration circuit as in claim 3 further comprising a plurality of switch circuits having pole terminals respectively coupled to the first capacitors, first switched terminals respectively coupled to the imaging sensor unit cell inputs, and second switched terminals respectively coupled to the reset inputs.

8. A time delay integration circuit as in claim 7 wherein the first and second transfer gates comprise MOSFET transistor switch transistors.

9. A time delay integration circuit as in claim 3 further comprising a first path control signal node, a second path control signal node, a set of first transfer control signal nodes, and a set of second transfer control signal nodes, wherein the first transfer gates are coupled to the first path control signal node and adjacent ones of the first transfer gates are respectively coupled to the first transfer control signal nodes and the second transfer control signal nodes, and wherein the second transfer gates are coupled to the second path control signal node and adjacent ones of the second transfer gates are respectively coupled to the first transfer control signal nodes and the second transfer control signal nodes.

10. A time delay integration circuit as in claim 9 further comprising a first phase clock node and a second phase clock node, wherein each of the first capacitor is coupled to the second phase clock node and each of the second and third capacitors is coupled to the first phase clock node.

11. A time delay integration circuit as in claim 10 further comprising a plurality of switch circuits having pole terminals respectively coupled to the first capacitors, first switched terminals respectively coupled to the imaging sensor unit cell inputs, and second switched terminals respectively coupled to the reset inputs.

12. A sensor chip assembly time delay integration circuit comprising a plurality of successively coupled circuit groups, wherein each of the circuit groups comprises:

a first phase clock node;

a second phase clock node;

a reset node;

a unit cell input circuit;

a first capacitor having a first plate coupled to the second phase clock node and a second plate;

a switch having first and second terminals and a pole terminal, the first terminal being coupled to the reset node, the second terminal being coupled to the unit cell input circuit, and the pole terminal being coupled to the second plate of the first capacitor;

a first transfer gate having a first terminal coupled to the second plate of the first capacitor and a second terminal;

a second transfer gate having a first terminal coupled to the second plate of the first capacitor and a second terminal;

a third transfer gate having a first terminal coupled to the second plate of the first capacitor and a second terminal;

a fourth transfer gate having a first terminal coupled to the second plate of the first capacitor and a second terminal;

a second capacitor having a first plate coupled to the first phase clock node and a second plate coupled to the second terminal of the fourth transfer gate;

a third capacitor having a first plate coupled to the first phase clock node and a second plate coupled to the second terminal of the third transfer gate;

and wherein the second terminals of the first transfer gate and the second terminal of the third transfer gate of respective adjacent ones of the circuit groups are coupled together, and the second terminal of the second transfer gate and the second terminal of the fourth transfer gate of respective adjacent ones of the circuit groups are coupled together.

13. A sensor chip assembly time delay integration circuit as in claim 12 wherein:

the first, second, third, and fourth transfer gates are MOSFET transistors; and the switch is a MOSFET transistor circuit.

14. A method of time delay integration of image sensor charges, comprising:

storing accumulated image sensor charges from alternate sensor lines on respectively a plurality of first capacitors and a plurality of second capacitors;

resetting a plurality of third capacitors;

receiving a first set of image sensor charges on the third capacitors;

transferring charge from the first capacitors respectively to the third capacitors through a set of third transfer gates, wherein charge is accumulated on the third capacitors;

transferring charge from the third capacitors respectively to the first capacitors through a set of second transfer gates;

resetting the third capacitors;

receiving a second set of image sensor charges on the third capacitors;

transferring charge from the second capacitors respectively to the third capacitors through a set of third transfer gates, wherein charge is accumulated on the third capacitors; and transferring charge from the third capacitors respectively to the second capacitors through a set of fourth transfer gates.

15. A method as in claim 14 further comprising applying a first phase clock to the first and second capacitors, and a second phase clock to the third capacitors.

16. A method as in claim 14 further comprising applying a first path control signal to the first and second transfer gates, and a second path control signal to the third and fourth transfer gates.

17. A method as in claim 14 further comprising applying a set of first transfer control signals to the first and third transfer gates, and a set of second transfer control signals to the second and fourth transfer gates.

18. A method as in claim 14 further comprising:

applying a first phase clock to the first and second capacitors;

applying a second phase clock to the third capacitors;

applying a first path control signal to the first and second transfer gates;

applying a second path control signal to the third and fourth transfer gates;

applying a set of first transfer control signals to the first and third transfer gates; and applying a set of second transfer control signals to the second and fourth transfer gates.

* * * * *